Jan. 28, 1969  G. V. ANDERSON ET AL  3,424,891

PORTABLE WELDING CHAMBER

Filed March 16, 1967

INVENTOR.
GERALD V. ANDERSON
PHILLIP A. BEESON
BY

ATTORNEY

United States Patent Office

3,424,891
Patented Jan. 28, 1969

3,424,891
PORTABLE WELDING CHAMBER
Gerald V. Anderson, Westminster, and Phillip A. Beeson, Woodland Hills, Calif., assignors to North American Rockwell Corporation, a corporation of Delaware
Filed Mar. 16, 1967, Ser. No. 623,760
U.S. Cl. 219—121                           4 Claims
Int. Cl. B23k 9/00

ABSTRACT OF THE DISCLOSURE

The disclosure is of a circular vacuum chamber with a turntable lid thereon and rotatably movable with respect thereto. The turntable has an elongate slot covered by a longitudinal sliding plate translatable with respect to the turntable and in sealing contact therewith. An electron beam gun is mounted on the sliding plate. The chamber is supported on the workpiece surface in the case of large area workpieces. Electron beam cutting or welding operations may be progressively accomplished along a complex path on the workpiece surface including both straight line and curved segments by laterally moving the slidable plate and rotating the lid alternately or simultaneously as desired.

---

This invention concerns an improved method and apparatus for directing a beam of energy on a workpiece, such as in electron beam welding. The invention includes portable and lightweight chamber means for isolating a workpiece surface or portions thereof from surrounding atmosphere and mounting an electron beam source on such chamber by means permitting both linear and arcuate movement of the beam without removal of the chamber from the workpiece.

Summary of invention

According to a preferred embodiment of this invention, the portable chamber disclosed herein generally corresponds with that disclosed in U.S. Patent 3,301,993 issued Jan. 31, 1967, except that the chamber in the instant case is of circular shape, permitting much greater freedom in electron beam travel. The chamber in this case is adapted to contact a workpiece surface or may completely enclose a workpiece therein. The circular chamber has a flat disc-shaped turntable lid thereon. Drive means are provided on the chamber to rotate the turntable while the chamber remains stationarily aligned over the workpiece area sought to be welded. A longitudinal sliding plate translationally movable with respect to the turntable is supported thereon and drive means independent of those for rotating the turntable lid are provided for causing movement of the longitudinal lid. A source of concentrated energy such as an electron beam gun is supported in stationary relationship on the longitudinal lid and movable with the same as well as with the turntable top during rotation thereof. The chamber is evacuated of atmosphere as required to produce a vacuum such as normally required for electron beam welding. Translational movement of the longitudinal lid permits variation of the diameter of a circle traced by the electron beam during rotation of the turntable as desired. A complex pattern of welds or cuts can be made quickly and inexpensively over the area enclosed by the chamber thus disclosed due to the wide possible variation of relative movements between the separate components of the dual lid mounting arrangement thereon.

Detailed description of invention

Figure 1:
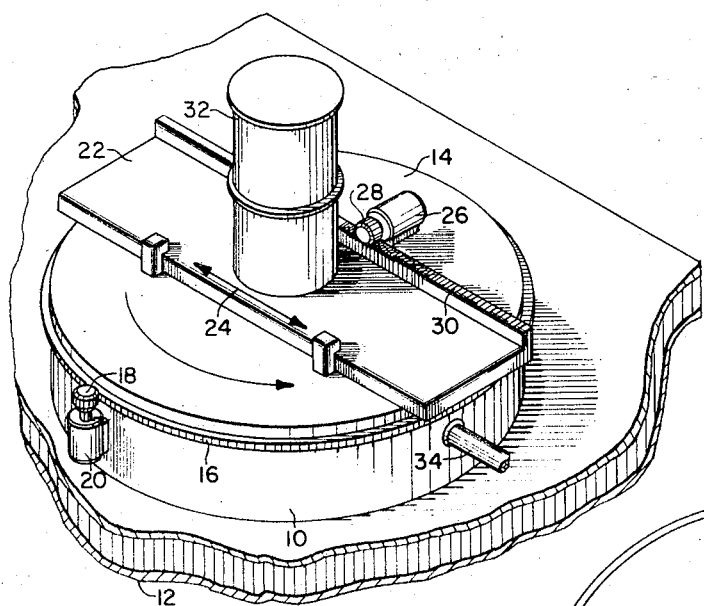
FIGURE 1 shows a general perspective view of the novel apparatus disclosed herein.
Figure 2:
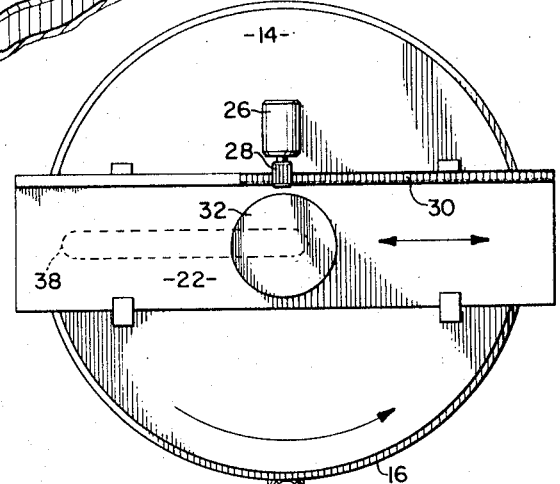
FIGURE 2 shows a plan view of the apparatus from FIGURE 1.
Figure 3:
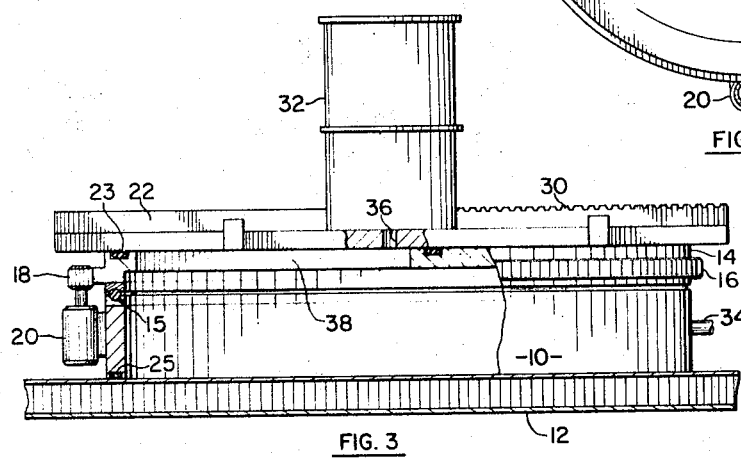
FIGURE 3 is a cross-sectional view taken through the center of the structure shown in FIGURE 2.

Referring to FIGURE 1, it may be seen that the invention in this case comprises a dual lid vacuum chamber assembly generally denoted by reference numeral 1, and includes a substantially cylindrical chamber 10 adapted to contact a workpiece surface 12 in sealing contact therewith and stationary relative thereto. Workpiece 12 illustratively comprises a portion of a large lightweight panel having a honeycomb core sandwiched between two steel face sheets. Chamber 10 has a substantially flat turntable lid portion 14 supported thereon. Sealing means 15 are provided to maintain sealing contact between lid portion 14 and the upper contacting surface of chamber 10. Such sealing means may comprise the dual O-ring arrangement disclosed in mentioned U.S. Patent 3,301,993, the details of which are not a significant feature of the invention in this case. Turntable 14 is rotatable relative to stationary chamber 10 by any suitable means which may illustratively take the form of an arcuate gear segment or an external ring gear 16 formed on the outer periphery of the turntable and operatively engaged by a pinion 18 rotatably driven by a reversible motor 20 which may be either electrical or fluid powered. Motor 20 is affixed to chamber 10 in stationary relationship therewith. Alternatively, it will be understood that motor 20 may be mounted on turntable 14 while ring gear 16 is secured or integrally formed on chamber 10. Turntable 14 supports a translationally movable longitudinal sliding lid portion 22 in sealing contact therewith. Sealing means 23 to maintain sealing contact between elements 14 and 22 may comprise the same dual O-ring arrangement disclosed in mentioned U.S. Patent 3,301,993. Sliding lid portion 22 is linearly movable in either of two opposite directions indicated by arrow 24 in FIGURE 1, such movement being accomplished by suitable means which may take the form of a motor 26 corresponding with motor 20 but affixed to turntable 14 and having a pinion 28 operatively engaging a gear rack 30 formed along one edge of sliding lid portion 22. Longitudinal lid portion 22 supports a high energy beam source such as electron gun 32 of suitable type known to the prior art, the details of which form no part of the inventive concept in this case.

In operation, it will be understood that chamber 10 is relatively small in size and sufficiently lightweight for portability whereby the chamber may be carried to a large workpiece and supported thereon so as to enclose the area sought to be cut or welded. Suitable sealing means 25 between chamber 10 and the contacting surface of workpiece 12 are provided, such as those disclosed in connection with the chamber described in mentioned U.S. Patent 3,301,993. Thereafter, a vacuum is created within chamber 10 by suitable means such as a vacuum pump (not shown) connected with chamber 10 through one or more ports 34 or the like. Thereafter, electron beam source 32 may be energized to create a beam of electrons which may be moved relative to workpiece 12 in order to trace a progressive cutting or welding path thereon. The stated movement is achieved by a combination of rotational movements of turntable lid portion 14 and translational movement of longitudinal lid portion 22 in any desired pattern. In addition, circular cuts of any desired radius or in a spiral pattern, may be achieved by programmed sequential or simultaneous movement of dual lid portions 14 and 22. The beam originating from source 32 passes through a small hole 36 in lid portion 22 and through an elongate slot 38 which is substantially half the length of lid portion 22. It will be understood that slot 22 is always covered by lid portion 22 continuously throughout the full range of movement thereof.

While the particular details set forth above are fully capable of attaining the objects and providing the advantages herein contemplated, the specific structure and method thus disclosed are merely illustrative and could be varied to produce the same results without departing from the scope of the inventive concept as defined in the appended claims.

We claim:
1. Apparatus for directing a high-energy beam to a workpiece surface, comprising:
chamber means including a chamber for isolating said workpiece surface from atmospheric pressure and creating a vacuum over said surface,
turntable lid means supported on said chamber in sealing contact therewith and rotationally movable with respect to said chamber, said turntable lid means having an elongate slot therethrough,
longitudinal lid means supported on said turntable lid means in sealing contact therewith and translationally movable with respect to said turntable lid means, said longitudinal lid means completely covering said slot, and
generating means for generating a high-energy beam mounted on said longitudinal lid means for movement translationally therewith and for movement rotationally with said turntable to direct said beam upon said surface through said slot and to move said beam with respect to said surface progressively along a path defined by said translational and rotational movements.

2. The apparatus set forth in claim 1 above, wherein:
said generating means comprises an electron gun.

3. The apparatus set forth in claim 1 above, further including:
first drive means comprising a first motor mounted on said chamber, a first rotatable pinion connected to said first motor, and an arcuate gear on said turntable lid means operatively engaging said pinion for causing said rotational movement of said turntable lid means by operation of said first motor.

4. The apparatus set forth in claim 3 above, further including:
second drive means comprising a second motor mounted on said longitudinal lid means, a second rotatable pinion connected to said second motor, and a gear rack on said longitudinal lid means operatively engaging said second pinion for causing said translational movement of said longitudinal lid means by operation of said second motor.

References Cited

UNITED STATES PATENTS

| | | | |
|---|---|---|---|
| 3,136,882 | 6/1964 | Radtke | 219—121 |
| 3,136,883 | 6/1964 | Radtke | 219—121 |
| 3,209,120 | 9/1965 | Glatthorn | 219—125 |
| 3,219,792 | 11/1965 | Pederson | 219 —121 X |
| 3,222,496 | 12/1965 | Windebank | 219—121 |
| 3,264,004 | 8/1966 | Sciaky | 219—121 X |
| 3,301,993 | 1/1967 | Boyd et al. | 219—117 |

JOSEPH V. TRUHE, *Primary Examiner.*

U.S. Cl. X.R.

219—72